Jan. 13, 1942.     H. FORD ET AL     2,269,452
AUTOMOBILE CHASSIS CONSTRUCTION
Filed July 27, 1940     2 Sheets-Sheet 1

Henry Ford
Eugene T. Gregorie
INVENTORS.

BY  Edwin C. McRae
E. L. Davis.
ATTORNEYS

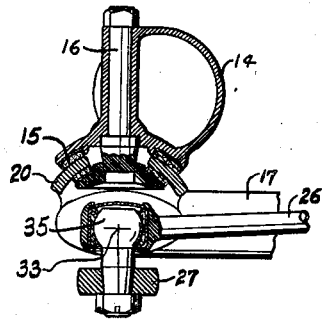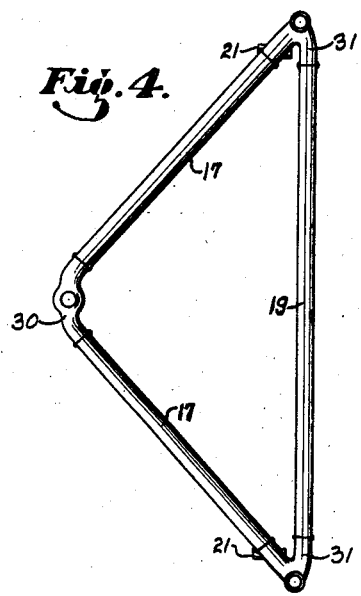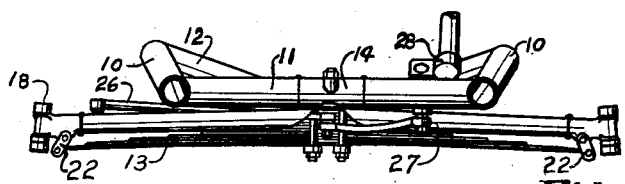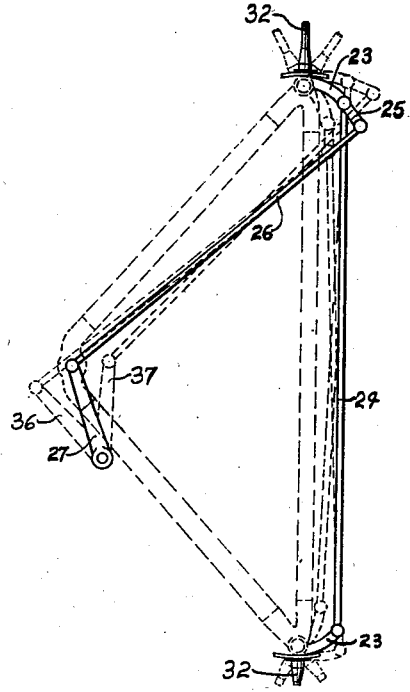

Patented Jan. 13, 1942

2,269,452

UNITED STATES PATENT OFFICE 2,269,452

AUTOMOBILE CHASSIS CONSTRUCTION

Henry Ford, Dearborn, and Eugene T. Gregorie, Grosse Ile, Mich., assignors to Ford Motor Company, Dearborn, Mich., a corporation of Delaware Application July 27, 1940, Serial No. 347,884

7 Claims. (Cl. 280—96.2)

The object of our invention is to provide an automobile chassis construction of simple, durable and inexpensive construction.

A further object of our invention is to provide an automobile chassis construction especially adapted for rear-engine driven vehicles wherein the weight distribution will be better proportioned than would occur if the conventional chassis were provided with a motor in the rear thereof.

A further object of our invention is to provide a spring suspension for the front end of a motor vehicle wherein the front wheels are steerably and rotatably mounted upon opposite corners of a triangular wheel supporting structure, the intermediate corner of which is universally mounted at the extreme forward end of the vehicle. In this arrangement the wheels trail in back of their connection with the frame so that when bumps are encountered the wheels swing away from the obstruction. In the conventional construction the wheels swing into the obstruction instead of swinging away from the same.

Still a further object of our invention is to provide a front wheel suspension wherein the axle and wheels are pivotally connected to the frame at only one point and wherein the steering connection between the wheels and the frame passes through this pivotal connection so that movement of the wheels relative to the frame will not in any way affect the steering of the car.

Still a further object of our invention is to provide a mounting for the front wheels of a motor vehicle which will be exceptionally light in weight in proportion to its weight and strength to thereby reduce the unsprung weight of the car and thus provide easier riding. The riding qualities of a motor vehicle depend to a great extent upon the weight of the unsprung elements, that is, the parts between the wheels and the spring so that even a slight reduction in this unsprung weight materially improves the riding qualities of the car.

With these and other objects in view, our invention consists in the arrangement, construction and combination of the various parts of our improved device, as described in this specification, claimed in our claims, and illustrated in the accompanying drawings, in which:

Figure 3 is a sectional view, taken on the line 3—3 of Figure 2.

Figure 4 is a plan view of the wheel supporting unit.

Figure 5 is a sectional view, taken upon the line 5—5 of Figure 2, and

Figure 6 is a diagrammatic view of the steering linkage employed herein.

Figure 1:
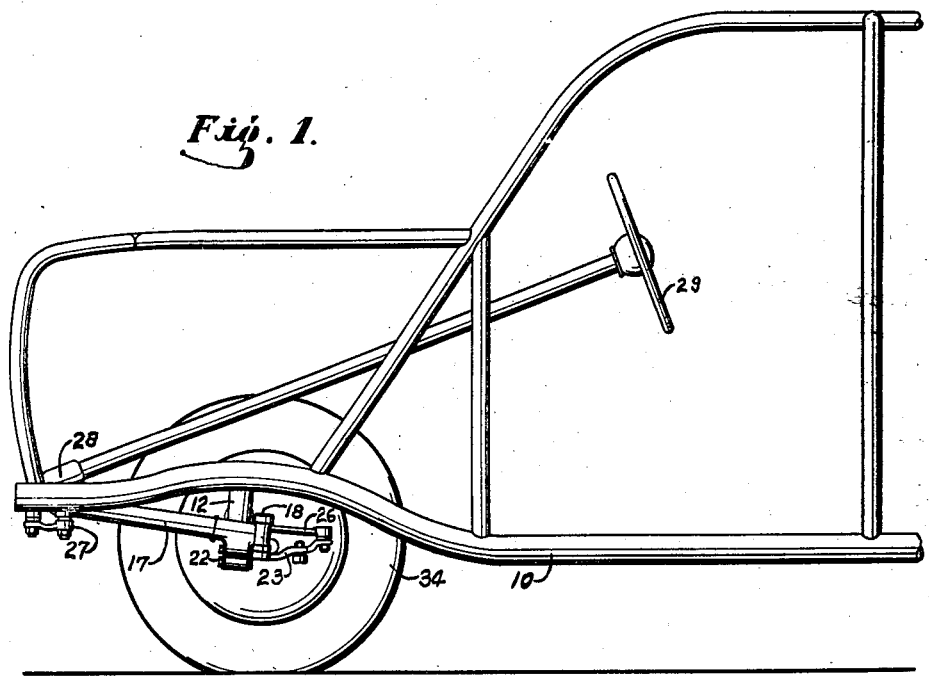
Figure 1 is a side elevation of the front end of a motor vehicle frame and body structure having an improved wheel suspension installed thereon.
Figure 2:
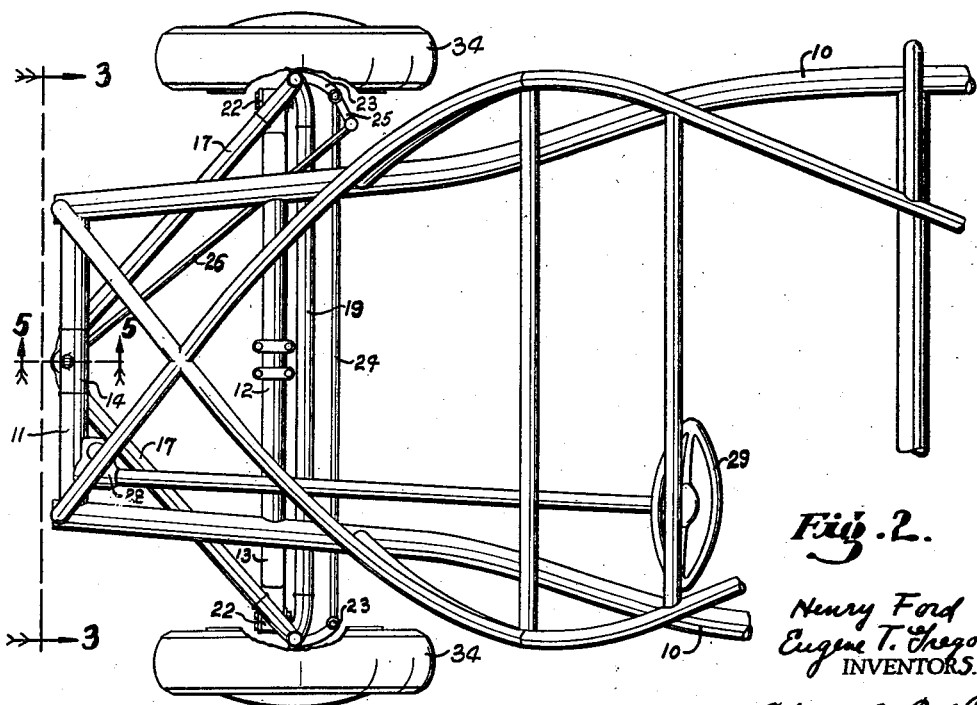
Figure 2 is a plan view of the construction shown in Figure 1.

Referring to the accompanying drawings, we have used the reference numeral 10 to designate a pair of tubular frame side members. These side members are connected at their forward ends by a tubular front cross member 11. A spring-supporting cross member 12 connects these frame members at points spaced rearwardly from the front end of the vehicle. A transverse leaf spring 13 is bolted to the underside of the spring supporting cross member 12 with the center portion of the spring clamped to the center of the supporting member. The ends of the spring extend transversely beyond the side members 10.

A section 14 is welded in the center portion of the front cross member 11, which section is provided with a spherical socket 15 therein having a spherical headed bolt 16 extending therethrough to form a spherical type of mounting, the center 33 of which is spaced below the section 14.

The wheel-supporting member used in this construction comprises a triangular-shaped tubular frame formed of a pair of diagonally extending tubular members 17 which have their forward adjacent ends welded to a center supporting member. The outer ends of these diagonal members are each welded to one arm of a pair of U-shaped king pin brackets 31, the other arms of which brackets are joined by a brace 19. The members 17 and brace 19 form the three sides of the triangle while the support 30 and brackets 31 form the corners of this triangular structure. King pins 18 are mounted in substantial vertical positions in the brackets 31 upon which wheel spindles 32 are pivotally mounted in the conventional manner. Spring perches 21 are formed in the brackets 31 and spring shackles 22 extend from each perch to the adjacent end of the spring 13. Wheels 34 are rotatably mounted upon the spindles 32 in the conventional manner.

A spherical seat 20 is formed on the support 30, which is held in the socket 15 by means of the bolt 16. The members 17 trail rearwardly from the seat 20.

In order to simultaneously steer the two wheels 34, we have provided steering arms 23 which extend rearwardly from the wheel spindles 32, which arms are connected by a tie rod 24. An extension arm 25 forms a continuation of the right wheel spindle arm 23, which extension is connected by means of a drag link 26 with a steering arm 27 which projects laterally from a steering gear 28. A steering wheel 29 is mounted in the body compartment of the vehicle and is connected to a shaft which extends therefrom down to the housing 28. The arm 27 and the drag link 26 are connected by means of a ball type fitting 35 and the parts are so arranged that when the wheels 34 are pointed straight ahead the center of the ball 35 will coincide with the center 33 of the seat 20. Thus, oscillation of the seat 20 and associated parts will cause no lengthening or shortening of the steering connections and consequently will have no effect on altering the course of the car.

The straight ahead position is shown by full lines in Figure 6, while the right turn position is shown by dotted lines 36 and the left turn position by dotted lines 37.

Among the many advantages arising from the use of our improved construction, it will be noted that the deflection of either front wheel, due to a road obstruction, pivots the wheel-supporting member 17 around a center which coincides with the center of the ball 35.

Still a further advantage results in that the supporting member is pivoted to swing around a point at the extreme forward end of the car so that the wheels trail over obstructions rather than being pushed into the obstructions.

Some changes may be made in the arrangement, construction and combination of the various parts of our improved construction without departing from the spirit of our invention and it is our intention to cover by our claims such changes as may reasonably be included within the scope thereof.

We claim as our invention:

1. In an automobile chassis, a chassis frame having a front cross member positioned at the forward end thereof and a spring-supporting cross member spaced rearwardly from said front cross member, a triangular-shaped wheel-supporting member pivotally mounted at one corner to the center of said front cross member, the other corners of said wheel-supporting member extending both laterally beyond said chassis and rearwardly to positions aligned with said spring-supporting cross member, a spring having its center portion rigidly fixed to said spring-supporting member and its ends shackled to the laterally extending corners of said wheel-supporting member, wheel spindles secured in said laterally extending corners of said wheel-supporting member, wheels rotatably mounted upon said spindles.

2. In an automobile chassis, a chassis frame having a front cross member positioned at the forward end thereof, a wheel-supporting member having arms which extend from the center of said cross member rearwardly and outwardly beyond the sides of said frame, the adjacent ends of said arms being fixed together and mounted upon the center part of said cross member by means of a spherical connection, a spring interposed between the outer ends of said arms and said frame, wheel spindles pivotally secured to the outer ends of said arms, and steering mechanism for said wheel spindles, said mechanism having a universal joint connection therein positioned at the center of said spherical connection.

3. In an automobile chassis, a chassis frame having a front cross member positioned at the forward end thereof, a wheel-supporting member having arms which extend from the center of said cross member rearwardly and outwardly beyond the sides of said frame, the adjacent ends of said arms being fixed together and mounted upon the center part of said cross member by means of a spherical connection, a spring interposed between the outer ends of said arms and said frame, wheel spindles pivotally secured on the outer ends of said arms, said spindles being connected together by means of a tie rod, a steering gear arm mounted upon said frame, the outer end of which swings in a path through the center of said spherical connection, and a drag link extending from said outer end to one of said spindles so that oscillation of said steering gear arm will oscillate said spindles by means of said drag link and tie rod.

4. In an automobile chassis, a pair of frame side members, a front frame cross member connecting the forward ends of said side members, a spring-supporting cross member extending between said side members in position spaced rearwardly from said front cross member, a triangular-shaped wheel-supporting member pivotally secured at one corner by means of a spherical connection to the center part of said front cross member, the other corners of said wheel-supporting member extending laterally beyond said side members and rearwardly to positions aligned with said spring-supporting cross member, a spring extending between each laterally extending corner of said supporting member and said frame, wheel spindles pivotally secured to the laterally extending corners of said wheel-supporting member, and steering mechanism for said wheel spindles, said mechanism having a universal joint connection therein positioned at the center of said spherical connection.

5. In an automobile chassis, a chassis frame having a front frame cross member positioned at the forward end thereof, a wheel-supporting member having its center portion mounted for universal movement upon the center portion of said cross member, the ends of said wheel-supporting member extending rearwardly of said cross member and laterally to positions outside of said chassis frame, a transverse spring extending between the ends of said wheel-supporting member and said chassis frame, wheel spindles pivotally secured to the ends of said wheel-supporting member, wheels rotatably mounted upon said spindles, a steering arm mounted upon said frame, the free end of which passes through the center of said universal connection, a tie rod connecting said spindles and a drag link connecting one of said spindles with the free end of said steering arm, the connection between said drag link and steering arm being of the ball type.

6. In an automobile chassis, a pair of frame side members, a front frame cross member positioned at the forward end of said chassis between the frame side members, a spring-supporting cross member extending between said side members in position spaced rearwardly from said front cross member, a rigid triangular-shaped wheel-supporting member, one corner of which is spherical connected for universal movement with the center part of said front cross member with the adjacent sides of said supporting member extending diagonally to positions longitudinally aligned with said spring-supporting cross member, a transverse spring extending between the outer ends of said wheel-supporting member and said spring-supporting cross member, wheel spindles pivotally secured to the outer ends of said wheel-supporting member, wheels rotatably mounted upon said spindles, a steering arm mounted upon said frame for movement through the center of said spherical connection, and steering mechanism connecting said steering arm and said spindles, said mechanism comprising a ball joint disposed in alignment to the center of said spherical connection.

7. In an automobile chassis, a chassis frame comprising a forward cross member positioned in the forward portion of said chassis, a spring-supporting cross member spaced from said forward cross member, a wheel-supporting member comprising a triangular-shaped structural member having one corner secured for universal movement to the center of said forward cross member by means of a spherical connection, the other corners of said wheel-supporting member extending obliquely outwardly to positions longitudinally aligned with said spring cross member, a transverse leaf spring fixed at its center portion to said spring-supporting member, and having its ends shackled to the outer corners of said wheel-supporting member, wheel spindles pivotally secured to the ends of said wheel-supporting member, wheels rotatably mounted upon said spindles and steering mechanism for simultaneously pivoting said spindles, said mechanism having a swivelling connection therein positioned substantially at the center of said spherical connection when the said wheels are aligned parallel with said frame.

HENRY FORD.
EUGENE T. GREGORIE.